(12) United States Patent
Zhang

(10) Patent No.: US 10,904,513 B2
(45) Date of Patent: Jan. 26, 2021

(54) CAMERA IMAGE FUSION METHODS

(71) Applicant: University of New Brunswick, Fredericton (CA)

(72) Inventor: Yun Zhang, Fredericton (CA)

(73) Assignee: University of New Brunswick, Fredericton (CA)

( * ) Notice: Subject to any disclaimer, the term of this patent is extended or adjusted under 35 U.S.C. 154(b) by 0 days.

(21) Appl. No.: 15/928,842

(22) Filed: Mar. 22, 2018

(65) Prior Publication Data

US 2018/0220122 A1 Aug. 2, 2018

Related U.S. Application Data

(63) Continuation of application No. 14/743,993, filed on Jun. 18, 2015, now Pat. No. 9,930,316, which is a (Continued)

(51) Int. Cl.
*H04N 13/25* (2018.01)
*H04N 5/33* (2006.01)
(Continued)

(52) U.S. Cl.
CPC .............. *H04N 13/25* (2018.05); *H04N 5/33* (2013.01); *H04N 5/332* (2013.01); *H04N 9/045* (2013.01); *H04N 9/04515* (2018.08); *H04N 9/04553* (2018.08); *H04N 9/04559* (2018.08); *H04N 9/09* (2013.01); *H04N 13/239* (2018.05); *H04N 13/257* (2018.05); *H04N 2013/0077* (2013.01);
(Continued)

(58) Field of Classification Search
CPC ...................................................... H04N 13/25

USPC ...................................................... 348/222.1
See application file for complete search history.

(56) References Cited

U.S. PATENT DOCUMENTS 3,785,469 A 1/1974 Stumpf
3,971,065 A 7/1976 Bayer
(Continued)

FOREIGN PATENT DOCUMENTS

DE 102008047413 A1 4/2010
JP 2009163210 A 6/1997
(Continued)

OTHER PUBLICATIONS

Chiman, Kwan, Bryan Chou, Li-Yun Martin Kwan,and Bence Budavari, Debayering RGBW Color Filter Arrays: A Pansharpening Approach, 2017 IEEE 8th Annual Ubiquitous Computing, Electronics and Mobile Communication Conference (UEMCON), Oct. 2017, 94-100, New York City.
(Continued)

*Primary Examiner* — Joel W Fosselman
(74) *Attorney, Agent, or Firm* — Eugene F. Derenyi; Fogler, Rubinoff LLP

(57) ABSTRACT

A method including providing a digital image from a camera imaging sensor wherein the image comprises both low resolution multispectral and panchromatic information; interpreting the digital image to obtain a low resolution multispectral digital image, interpreting the digital image to obtain a high resolution monochromatic digital, fusing the low resolution multispectral digital image and the high resolution monochromatic digital image to produce a high resolution colour image.

6 Claims, 15 Drawing Sheets

Related U.S. Application Data continuation-in-part of application No. 13/880,703, filed on Aug. 16, 2013, now Pat. No. 9,936,109.

(60) Provisional application No. 61/405,941, filed on Oct. 22, 2010.

(51) Int. Cl.
| | |
|---|---|
| *H04N 9/09* | (2006.01) |
| *H04N 13/257* | (2018.01) |
| *H04N 9/04* | (2006.01) |
| *H04N 13/239* | (2018.01) |
| *H04N 13/00* | (2018.01) |

(52) U.S. Cl.
CPC ............... *H04N 2013/0081* (2013.01); *H04N 2013/0092* (2013.01)

(56) References Cited

U.S. PATENT DOCUMENTS

| | | |
|---|---|---|
| 4,101,916 A | 7/1978 | Gotschalk |
| 4,652,909 A | 3/1987 | Glenn |
| 5,828,913 A | 9/1998 | Zanen |
| 5,852,502 A * | 12/1998 | Beckett ............... G11B 27/031 358/512 |
| 5,949,914 A * | 9/1999 | Yuen .................... G01C 11/025 382/254 |
| 6,785,469 B1 | 8/2004 | Ide |
| 6,788,338 B1 | 9/2004 | Dinev et al. |
| 7,057,647 B1 | 6/2006 | Monroe |
| 7,340,099 B2 | 3/2008 | Zhang |
| 7,425,693 B2 | 9/2008 | Shapira |
| 7,830,430 B2 | 11/2010 | Adams, Jr. et al. |
| 8,139,130 B2 | 3/2012 | Compton et al. |
| 8,493,482 B2 | 7/2013 | Cote |
| 8,854,420 B2 | 10/2014 | McClatchie |
| 9,930,316 B2 | 3/2018 | Zhang |
| 9,936,109 B2 | 4/2018 | Zhang |
| 2002/0110376 A1 | 8/2002 | MacLean |
| 2004/0075667 A1* | 4/2004 | Burky ................... G06T 11/001 345/589 |
| 2005/0231618 A1 | 10/2005 | Sugiyama |
| 2006/0119710 A1 | 6/2006 | Ben-Ezra |
| 2007/0024934 A1 | 2/2007 | Andams, Jr. et al. |
| 2007/0177819 A1 | 8/2007 | Ma et al. |
| 2007/0182819 A1 | 8/2007 | Monroe |
| 2007/0182840 A1 | 8/2007 | Monroe |
| 2007/0212056 A1 | 9/2007 | Nagata |
| 2007/0279494 A1 | 12/2007 | Aman |
| 2008/0024390 A1 | 1/2008 | Baker et al. |
| 2008/0170806 A1 | 7/2008 | Kim |
| 2009/0231447 A1 | 9/2009 | Paik |
| 2009/0309987 A1 | 12/2009 | Kimura |
| 2010/0149338 A1 | 7/2010 | Aggarwal et al. |
| 2012/0300031 A1 | 11/2012 | Horlander |
| 2016/0196637 A1 | 7/2016 | Nguyen et al. |

FOREIGN PATENT DOCUMENTS

| | | |
|---|---|---|
| JP | 2000023016 A | 1/2001 |
| JP | 2000102040 A | 4/2004 |
| JP | 2006074180 A | 3/2006 |
| JP | 2006197346 A | 7/2006 |
| JP | 2008092007 A | 4/2008 |
| JP | 2009044475 A | 2/2009 |
| JP | 2009128726 A | 6/2009 |
| WO | 200230131 A2 | 4/2002 |
| WO | 2009026064 A2 | 2/2009 |

OTHER PUBLICATIONS

James Dibella, Marco Andreghetti, Amy Enge, William Chen, Timothy Stanka, Robert Kaser, Improved Sensitivity High-Definition Interline CCD using the Kodak Truesense Color Filter Pattern, Proc. SPIE vol. 7536, Sensors, Cameras, and Systems for Industrial/Scientific Applications XI, Jan. 2010.

Gerhard Neukum et al., The Airborne HRSC-AX Cameras: Evaluation of the Technical Concept and Presentation of Application Results after One Year of Operations, Photogrammetric Week 2001, D. Fritsch & R. Spiller, Eds. Wichmann Verlag, Heidelberg 2001, 117-131, Berlin, Germany.

Yun Zhang, Understanding Image Fusion, Photogrammetric Engineering & Remote Sensing, Jun. 2004, 657-661, 70(6).

Yun Zhang, Conception of a high-speed digital color imaging device, Conference vol. 5920, Ultrafast X-Ray Detectors, High-Speed Imaging, and Applications, Jul. 31, 2005, San Diego USA.

Gail Overton, Image fusion triples resolution of color sensors, Laser Focus World, Jun. 2005.

Wei-Yi Wei, An Introduction to Image Compression, Graduate Institute of Communication Engineering National Taiwan University, 2004, Taipei, Taiwan, 2014.

Bernie Brower, Image Compression Basics, Kodak and NIMA Systems Engineering Services, pp. 1-66, 2014.

Bernie Brower, Basic Image Compression or Compression 101, Kodak and NIMA Systems Engineering Services, date unknown, 1-44.

Jose A. Malpica, Hue Adjustment to IHS Pan-Sharpened IKONOS Imagery for Vegetation Enhancement, IEEE Geoscience and Remote Sensing Letters, Jan. 2007, 27-31, 4(1).

Yun Zhang, Problems in the Fusion of Commercial High-Resolution Satellite Images as well as LANDSAT 7 Images and Initial Solutions, Symposium on Geospatial Theory, Processing and Applications, Jul. 2002, 1-6.

Michael Deluca, Improved Light Sensitivity in Color CCD Image Sensors: the Kodak Truesense color filter pattern, Kodak white paper, date unknown, 1-21.

Pohl, C. et al., MULTISEMSOR Image Fusion in Remote Sensing: Concepts, Methods and Applications, International Journal of Remote Sensing, Basingstoke, Hants, GB, vol. 19, No. 5, 1998, pp. 823-854, XP008044449.

Examination Report No. 1 dated Mar. 24, 2017—Australian Patent application No. 2016201624.

English Summary of Rejection Decision dated Mar. 3, 2017—Chinese Patent Application No. 201180062236.2 filed Jul. 26, 2013.

Han et al, "Fusion of color and infrared video for moving human detection", Pattern Recognition, Elsevier, GB, vol. 40, No. 6 Mar. 18, 2007, pp. 1771-1784, XP005927734, ISSN:0031-3203, DOI: 10.1016/J.PATCOG.2006.11.010.

Extended European Search Report dated Feb. 2, 2015—EP Application No. 11833684.1.

Examiner's Report dated Jan. 24, 2017—EP Application No. 11833684.1.

Office Action dated May 23, 2013—Canadian Patent Application No. 2,811,260.

* cited by examiner

CAMERA IMAGE FUSION METHODS

CROSS-REFERENCE TO RELATED APPLICATIONS

This application is a continuation of U.S. patent application Ser. No. 14/743,993 filed Jun. 18, 2015, which is a continuation-in-part of U.S. patent application Ser. No. 13/880,703 filed Aug. 16, 2013, which claims the benefit of U.S. Provisional Patent Application Ser. No. 61/405,941 filed Oct. 22, 2010.

FIELD

This invention relates to camera imaging.

SUMMARY

Figure 1:
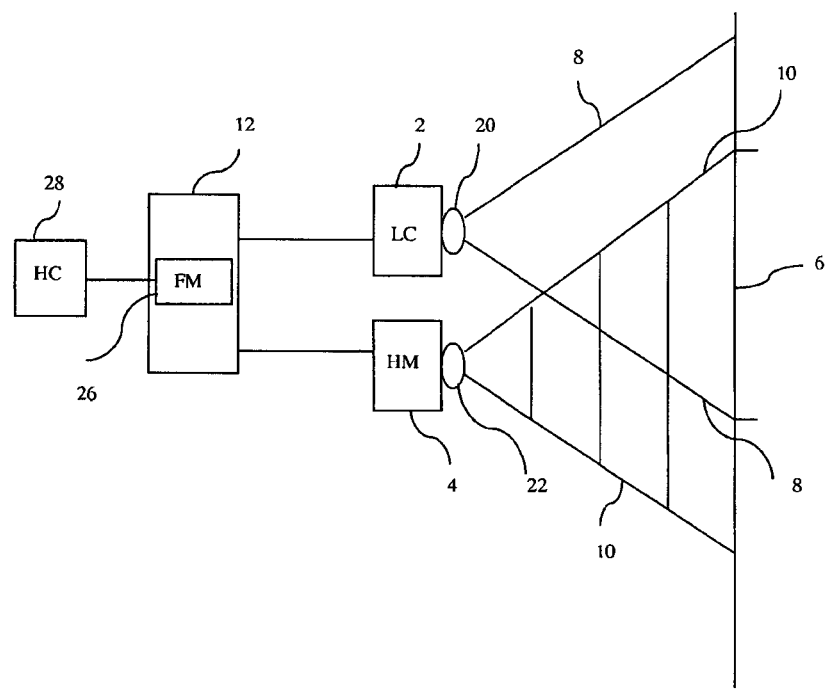
FIG. 1 is a schematic diagram of a dual video image system according to one or more embodiments of the present invention.

According to one or more embodiments of the present invention, a video imaging system comprising a low resolution colour digital video camera and a high resolution monochromatic digital video camera operably connected to a digital processing system. The system can further comprise an object motion module for detecting objects moving within the fields of view of the cameras, and an object position module for determining the position of an object in the overlapping field of view of the cameras.

According to one or more embodiments of the present invention, a method comprising providing an image frame from a low resolution colour digital video camera and a corresponding image frame from high resolution monochromatic digital video camera and fusing the two image frames to obtain a colour image having higher resolution than the image frame from the low resolution colour digital video camera. The method can further comprise providing a three dimensional coordinate system for determining the position of a moving object in the overlapping fields of view of the cameras whereby the two dimensional position of the moving object is determined according its position in the images, whereas the distance from the cameras to the object in the axis perpendicular to the plane of the images is derived from the parallax error between the two image frames to be fused.

According to one or more embodiments of the present invention, a camera imaging system comprising a low resolution colour digital sensor chip, a high resolution monochromatic digital sensor chip, a beam splitter, and a lens, wherein the lens gathers incident light towards the beam splitter, and the beam splitter splits the light towards the two sensor chips. The system further comprises a digital processing system which fuses a low resolution colour image from the colour sensor and a high resolution monochromatic image from monochromatic sensor to produce a high resolution colour image.

In another aspect, the technology relates to a method to:
(1) directly capture data-volume-reduced or compressed color images or video image frames by a camera system compared to those from conventional color camera systems with the same image resolution, and (2) retrieve uncompressed color images or video image frames for display, visualization, or other image/video processing at the end user side.

In another aspect, the technology relates to:
(1) directly recording a data-volume-reduced or compressed colour image (at a compression ratio of for example, more than 2:1) compared to that from a conventional color camera with the same image resolution, for any raw color images), without applying any image compression,
(2) optionally allowing for further compression to achieve a higher compression ratio when an image compression is applied,
(3) reaching a higher compression ratio than conventional image compression techniques for the same color image quality, and
(4) saving processing time on the camera and saving battery power of the device in the case that the device is battery powered.

For example, the raw data volume of a conventional 9 mega pixels ("MP") color camera is 3×9 MP for a total of 27 MP, with each color band (R, G, B) having 9 MP. In a camera system according to an embodiment of the invention with the same resolution, the data volume would be less. For example, in a color camera system according to the invention which includes a 1 MP color sensor and a 9 MP Pan sensor, the combined raw data volume of images of a scene acquired by the sensors is only 3 MP for the color sensor (1 MP for each of the 3 color bands) plus 9 MP for the Pan sensor for a total of 12 MP. After pan-sharpening, the data volume becomes 3×9 MP for a total of 27 MP. Therefore, the combined raw data volume of the images before pan-sharpening is equal to the data volume of an equivalent lossless compressed color image.

In certain embodiments, the camera sensor can be ground-based, aerial vehicle based including unmanned aerial vehicle ("UAV")-based, or satellite-based including small satellite based.

In other aspects, the technology relates to methods to minimize the data volume for storage and transmission and to maximize image resolution and image quality for display and visualization.

In another aspect, the technology relates to a method including providing a low resolution multispectral digital image from a camera imaging system, providing a high resolution monochromatic digital image from the camera imaging system, where the images are of the same scene and have a degree of overlap, generating, at the camera imaging system, a single digital file comprising the images, where the images have a common file format, and are suitable for processing into a fused high resolution multispectral image by a client device, and where the combined data volume of the low resolution multispectral digital image and the monochromatic digital image is less than the data volume of the fused high resolution multispectral image. The method may further include de-bayering the multispectral digital image into individual color image bands. The method may also further include binning a high resolution multispectral image to produce a low resolution multispectral image. The method may also include the low resolution multispectral digital image in generating the single digital file. In the method, the low resolution multispectral digital image may include color bands selected from the group consisting of red, green, blue, near infrared and beyond. In the method, the digital file may further include a format name which is readable by a digital image fusion software to enable the software to process the images into a fused high resolution multispectral image. In the method, the common file format may be selected from the group consisting of a file compression format, TIFF, JPEG, JPEG2000, raw format, and other formats. In the method, the multispectral digital image may include a plurality of multispectral digital image frames forming a video, and the monochromatic digital image comprises a plurality of monochrome digital image frames forming a video. In the method, the common file format may be selected from the group consisting of a video compression format, H.264, MPEG-4, and other formats.

In another aspect, the technology relates to a camera imaging system including a multispectral digital sensor, a monochromatic digital sensor, a processor, a memory in communication with the processor, the memory storing a plurality of processing instructions that, when executed, cause the processor to perform operations including receiving a low resolution multispectral digital image from the multispectral digital sensor, receiving a high resolution monochromatic digital image from the monochromatic digital sensor, where the images are of the same scene and have a degree of overlap, formatting the images with a common file format, generating a single digital file comprising the formatted images, where the file can be read by a digital image fusion software at a client device to enable the software to process the images into a fused high resolution multispectral image at the client device, and where the combined data volume of the low resolution multispectral digital image and the monochromatic digital image is less than the data volume of the fused high resolution multispectral image. In the camera imaging system, the operations performed by the processor may further include de-bayering the multispectral digital image into individual color image bands. The method may further include binning a high resolution multispectral image to produce a low resolution multispectral image. The method may also include the low resolution multispectral digital image in generating the single digital file. In the camera imaging system, the low resolution multispectral digital image may further include color bands selected from the group consisting of red, green, blue, near infrared, and beyond. In the camera imaging system, the operations performed by the processor may further include assigning a format name to the single digital file which is readable by the digital image fusion software to indicate to the software that the single file comprises a low resolution multispectral digital image and a high resolution monochromatic digital image which are in a format suitable for processing into a fused high resolution multispectral image by the software at the client device. In the camera imaging system, in the operations performed by the processor, the common file format may be selected from the group consisting of a file compression format, TIFF, JPEG, JPEG2000, raw format and other image formats. In the camera imaging system in the operations performed by the processor, the multispectral digital image may include a plurality of multispectral digital image frames forming a video, and the monochromatic digital image comprises a plurality of monochrome digital image frames forming a video. In the camera imaging system, in the operations performed by the processor, the common file format may be selected from the group consisting of a video compression format, H.264, MPEG-4, and other formats.

In another aspect, the technology relates to a method including receiving a single digital file comprising a low resolution multispectral digital image and a high resolution monochromatic digital image, where the images have been acquired by a camera imaging system, have a common file format, and are suitable for processing into a fused high resolution multispectral image, and where the combined data volume of the low resolution multispectral digital image and the monochromatic digital image is less than the data volume of the fused high resolution multispectral image, and processes the images at a client device, using digital image fusion software, into a fused high resolution multispectral image. In the method, the single digital file may be received on the client device over a network or by direct connection to the camera imaging system. The method may further include de-bayering the low resolution multispectral digital image into individual color image bands and including the individual color image bands in place of the low resolution multispectral digital image in the processing step. In the method, the low resolution multispectral digital image may include color bands selected from the group consisting of red, green, blue, near infrared, and beyond. In the method, the digital file may further include a format name which is readable by the digital image fusion software to indicate to the software that the single file comprises a low resolution multispectral digital image and a high resolution monochromatic digital image which are in a format suitable for processing into a fused high resolution multispectral image by the software. In the method, the common file format may be selected from the group consisting of a file compression format, TIFF, JPEG, JPEG2000, raw format and other formats. In the method, the multispectral digital image may include a plurality of multispectral digital image frames forming a video, and the monochromatic digital image comprises a plurality of monochrome digital image frames forming a video. In the method, the common file format may be selected from the group consisting of a video compression format, H.264 MPEG-4, and other formats.

In another aspect, the technology relates to a client device including a processor, a memory in communication with the processor, the memory storing a plurality of processing instructions that, when executed, cause the processor to perform operations including receiving a single digital file comprising a low resolution multispectral digital image and a high resolution monochromatic digital image, where the images have been acquired by a camera imaging system, have a common file format and, are suitable for processing into a fused high resolution multispectral image, and where the combined data volume of the low resolution multispectral digital image and the monochromatic digital image is less than the data volume of the fused high resolution multispectral image, processing the images at a client device, using digital image fusion software, into a fused high resolution multispectral image. In the device, the operations performed by the processor may further include de-bayering the multispectral digital image into individual color image bands, binning a high resolution multispectral image to produce a low resolution multispectral image, and/or including the low resolution multispectral digital image in the processing operation. In the device, the low resolution multispectral digital image may include color bands selected from the group consisting of red, green, blue, near infrared and beyond. The device may further include a format name which is readable by the digital image fusion software to indicate to the software that the single file comprises a low resolution multispectral digital image and a high resolution monochromatic digital image which are in a format suitable for processing into a fused high resolution multispectral image by the software. In the device, the common file format may be selected from the group consisting of a file compression format, TIFF, JPEG, JPEG2000, raw format, and other formats. In the device, the multispectral digital image may include a plurality of multispectral digital image frames forming a video, and the monochromatic digital image comprises a plurality of monochrome digital image frames forming a video. In the device, the common file format may be selected from the group consisting of a video compression format, H.264, MPEG-4, and other formats.

In the methods and systems according to certain embodiments of the invention, the multispectral image may be a color image which has a narrow spectral bandwidth, and the monochromatic image may be a panchromatic image or black and white image which has a broad spectral bandwidth.

In another aspect, the technology relates to a computer readable storage medium storing instructions that, when executed by a processor, causing the processor to perform steps according to the embodiments of the invention described herein.

A camera system according to one or more embodiments of the present invention can capture compressed color images and achieve higher light sensitivity and better image quality compared to conventional 1-chip and 3-chip color cameras is provided. The camera system utilizes human eyes' sensitivity difference to luminance and chrominance, sensors' sensitivity difference to panchromatic (Pan) and multispectral (MS, or color) images, and light energy distribution in visible and infrared spectrum to achieve the goals of color image compression, sensor sensitivity improvement and image quality improvement.

Figure 6:
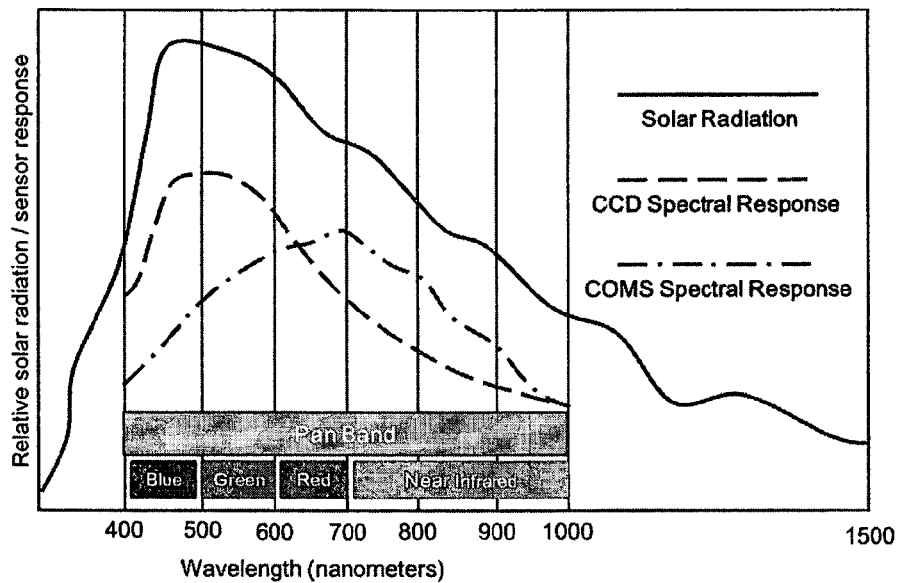
FIG. 6 illustrates the general relationship between solar radiation and sensor response with respect to the wavelengths and spectral bandwidths of Pan and MS spectral bands (prior art)

FIG. 6 illustrates the general relationship between solar radiation and sensor response with respect to the wavelengths and spectral bandwidths of Pan and MS spectral bands. Because Pan sensors mainly capture luminance information and MS sensors mainly capture chrominance information and also because Pan sensors are much more sensitive than MS sensors due to their much broader spectral bandwidths, these characteristics are utilized in this invention to directly capture compressed color images. The general principle of the system according to an embodiment of the present invention is described in the following sections in more detail.

A method according to one or more embodiments of the present invention, includes (1) using a panchromatic (Pan) sensor to capture a Pan (black and white) image covering a broad spectral bandwidth of the incoming light and (2) a multispectral (MS) sensor to capture a MS (color) image with a lower spatial resolution to reduce the data volume. The two images are from the same scene and overlap with each other. The combination of a high resolution Pan image and a low resolution MS color image forms a compressed high resolution color image, which mimics a lossless compression through the RGB to YUV conversion and the downsampling of the chrominance components in an image compression process.

A camera with a Pan and a MS sensor is referred to herein as a 2-chip color camera. The Pan sensor in the 2-chip color camera is a CCD (charge-coupled device) or CMOS (complementary metal-oxide-semiconductor) sensor. The Pan sensor can be used without a light filter in order to capture as much light as possible. The Pan sensor can also be used with a partial light filter to block certain unwanted light, such as near infrared, to capture a broad spectral bandwidth of the incoming light in visible spectral area.

The MS sensor in the 2-chip color camera is a CCD or CMOS sensor with a color filter to allow each pixel to receive only one color, either blue, green, red or near infrared. The near infrared includes all the light in the infrared area that can be sensed by a CCD or CMOS sensor. The MS sensor can also be designed to allow each pixel to receive blue, green or red light respectively to capture a natural color image. In order to capture special colors for special uses, the color filter can also be designed to allow each pixel to receive blue, green or red, or a color in the spectral wavelength below blue, between blue and green, green and red, red and near infrared, or different near infrared bands, respectively.

A high resolution color image can be produced by fusing the high resolution Pan image and the low resolution MS image before displaying or printing or using the high resolution color image, or before the manipulation of the high resolution color image for other image processing or visualization purposes. This fusion process mimics the image decompression process of a conventional image compression and decompression process.

Ideally, the chip sizes of the Pan and MS sensors are the same, and the optical lenses of the two sensors are also the same. This allows for the two sensors to capture images covering the same area with the same dimension. However, the spatial resolution of the Pan image is higher than that of the MS image. The low resolution MS image is either directly collected by a low resolution MS sensor with a larger pixel size, or generated by binning the pixels of a high resolution MS sensor or binning the color image pixels collected by a high resolution MS sensor.

If the chip sizes of the Pan and MS sensors are not the same, some optical adjustments can be applied to ensure the alignment of the image scenes of the high resolution Pan image and the low resolution MS image.

The benefit of capturing a high resolution Pan image and a low resolution MS image is not only the reduction of image data volume, but also the increase of the sensitivity of the 2-chip color camera and the improvement of the color image quality. Because a Pan sensor is much more sensitive than an MS sensor, and the sensitivity of a color sensor can be increased by lowering the resolution of the color image through either enlarging the sensor pixel size or binning the image pixels, a high resolution Pan sensor and a low resolution MS sensor with a similar level of high sensitivity can be found or created. The combination of the two highly sensitive sensors creates a highly sensitive and high resolution color camera.

In addition, the 2-chip color camera can produce full resolution color images (i.e. every pixel in every color band has information); whereas a conventional 1-chip color camera can only produce "hollow" resolution color images (i.e. only ¼ of the pixels in blue and red bands and ½ of the pixels in green band have information).

DETAILED DESCRIPTION

Referring to FIG. 1, an overall system configuration for a dual video imaging system according to an embodiment of the present invention comprises a colour digital video camera 2 having lens 20 and a monochromatic digital video camera 4 having lens 22. The cameras 2 and 4 each generate a digital signal of scene 6, which is then transmitted to digital processing system ("DPS") 12.

The cameras 2 and 4 employ charge-coupled device ("CCD") sensors or complementary metal-oxide-semiconductor ("CMOS") sensors. Camera 2 is a low resolution colour ("LC") video camera while camera 4 is a high resolution monochrome ("HM") video camera. Cameras 2 and 4 are capable of providing streaming video signals as part of a security, surveillance or monitoring system. It will be understood, however, that the applications for the cameras 2 and 4 are not limited to such systems.

Camera 2 has a field of view defined by light rays 8 while camera 4 has a field of view defined by light rays 10. Colour camera 2 and monochrome camera 4 produce separate streaming video signals which are then supplied to the DPS 12. The cameras 2 and 4 are adjacent and can be housed together in a single camera housing (not shown).

The low resolution colour streaming video signals from camera 2 are fused by image fusing module ("FM") 26 in processor 12 with corresponding high resolution monochrome streaming video signals from camera 4 to produce a fused high resolution colour streaming video signal ("HC") 28. Fusing the colour and monochrome video signals provides the dual camera system with improved sensitivity capable of acquiring high resolution colour video signals under poor lighting conditions due to the inclusion of the high resolution signal from the monochrome camera and the colour signal from the colour camera.

The colour and monochrome video signals are comprised of individual image frames. Corresponding pairs of video image frames from cameras 2 and 4 are isolated and then fused. Various methods for fusing the frame pairs can be used. For example, image fusion methods for fusing a low resolution multispectral satellite images with high resolution panchromatic satellite images are known in the field of remote sensing and can be adapted to fuse video image frames from cameras 2 and 4. One such fusion method is disclosed in U.S. Pat. No. 7,340,099 (Zhang) which is incorporated herein by reference in its entirety. Other image fusion methods used for satellite imagery include arithmetic based, statistics based, ratio based and wavelet based methods. By substituting colour and monochrome video image frame pairs according to the present invention for multispectral and panchromatic images respectively, prior art image fusing methods can be adapted to fuse video image frames acquired by camera 2 with video image frames acquired by camera 4.

Figure 2:
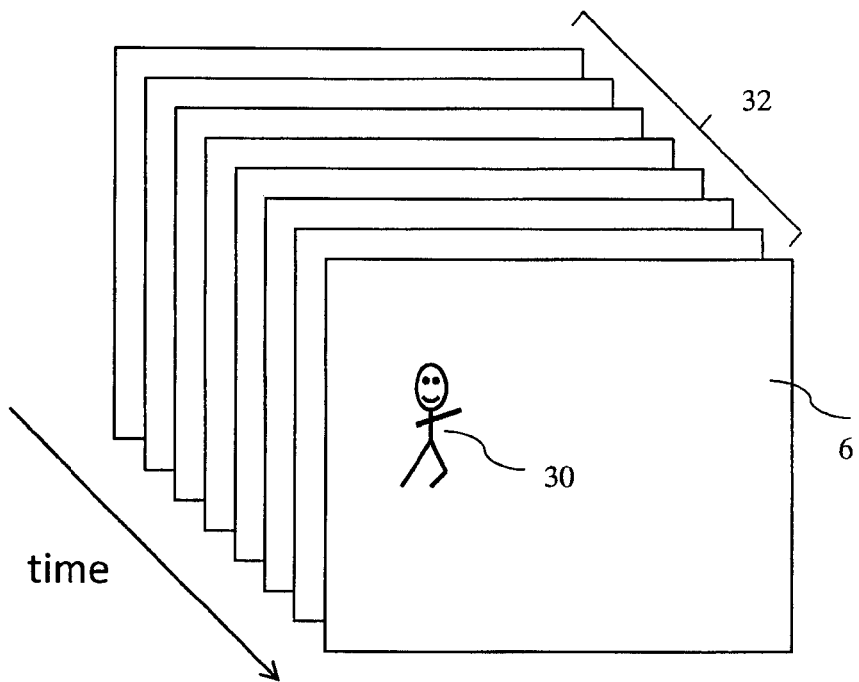
FIG. 2 is a schematic diagram of consecutive image frames according to one or more embodiments of the present invention.

In a further aspect, referring to FIG. 2, a moving object 30 in the scene 6 can be detected by both video cameras 2 and 4 based on finding changes in the consecutive image frames 32 of each video camera. If there is no moving object in the scene 6, the images in the consecutive frames will be the same. If there is a moving object 30 in scene 6, the images in the consecutive frames will be not the same. The changed area between two adjacent frames is the location of the moving object on the image. The changed areas can be found by comparing images in adjacent frames. Suitable conventional methods, techniques and algorithms for comparing consecutive image frames and finding changes in such image frames can be adopted for this system to find moving objects in consecutive images frames from each of the two cameras 2 and 4.

Figure 3:
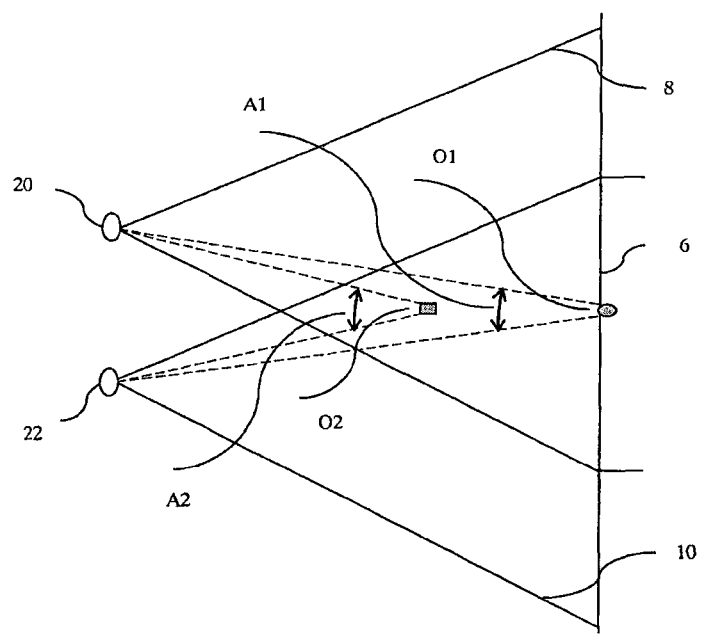
FIG. 3 is a schematic diagram of a two camera system according to one or more embodiments of the present invention.

In a still further aspect, referring to FIG. 3, the position of objects O1 and O2 in the scene 6 is provided in a three dimensional coordinate system. Since cameras 2 and 4 are adjacent, not overlaid with each other, the light rays from lens 20 and lens 22 to any object in the scene 6 are not parallel. The closer the object to the two lenses, the larger the angle between the two light rays from the two lenses to the object. For example, the object O2 is closer to the two lenses 20 and 22 than is object O1. The angle A2 is therefore larger than angle A1. The distance from lenses 20 and 22 to any object in the scene 6 can be calculated according to the base line distance between lenses 20 and 22 and the viewing angle between the two light rays. This distance gives the coordinate along the Z-axis of the three-dimensional coordinate system. Using the base line distance between the two lenses and the viewing angle between the two light rays to determine the distance from an airborne sensor to a ground object is well known in the fields of photogrammetry and computer vision. Such methods can be adapted to determine the distance to objects in the scene 6 because cameras 2 and 4 view essentially the same scene, but there is a parallax between the field of view 8 of camera 2 and the field of view 10 of camera 4.

The plane of the image frames 32 in FIG. 2 is defined by an X-Y coordinate system which is used to position objects (such as object 30) in two dimensions on the image frames 32. The X-Y axis position of an object plus its Z-axis position provides the object's position in three dimensions relative to cameras 2 and 4. The X-Y-Z positions are provided to a position calculating module in the DPS 12 which calculates the position of objects in the scene 6. The position calculating module is programmed with suitable computer algorithms based on prior art photogrammetric or computer vision methods as described above.

In one or more embodiments, the dual camera system according to the present invention provides colour video with improved sensitivity compared with a conventional video camera, the detection of moving objects, and the three dimensional position of the objects in the common field of view of the cameras 2 and 4.

According to one or more embodiments of the present invention, methods of the present invention can be applied to image frames from two corresponding still cameras.

Figure 4:
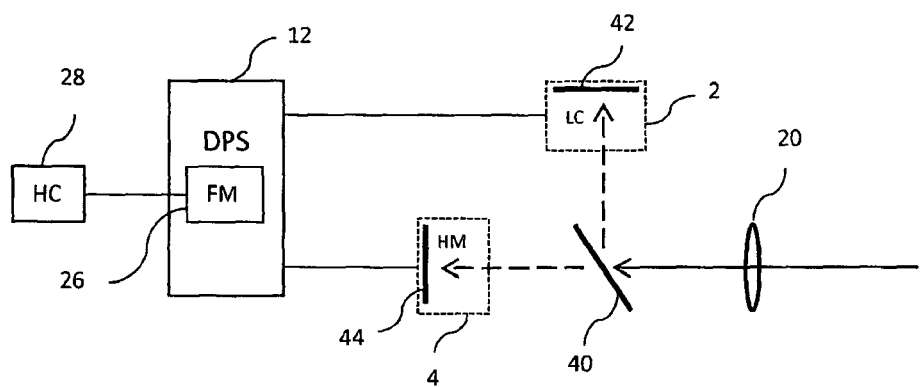
FIG. 4 is a schematic diagram of a two sensor single lens system according to one or more embodiments of the present invention.

In a still further aspect, referring to FIG. 4, the dual imaging system described above with initial reference to FIG. 1 is modified by replacing the dual cameras and dual lenses with a dual sensor single lens camera. Lens 22 is omitted and a light splitter 40 is added. The light beam splitter 40 splits the incoming light into two directions. Camera 2 is re-configured with its low resolution digital colour sensor 42 towards one of the split light beams and camera 4 is re-configured with its high resolution monochrome digital sensor 44 towards the other split beam.

Cameras 2 and 4 are positioned such that when the light splitter 40 splits the incoming light into two directions, about half of the incident light is directed towards the colour digital sensor 42 and about the other half of the incident light is directed towards the monochromatic digital sensor 44. In this embodiment, the capacity of detecting distance from the camera to a moving object is reduced.

Separate streaming video signals from sensors 42 and 44 are then supplied to the DPS 12 in a similar manner to the signals from cameras 2 and 4 in the system described with initial reference to FIG. 1.

Low resolution colour streaming video signals from sensor 42 are fused by the FM 26 in processor 12 with corresponding high resolution monochrome streaming video signals from sensor 44 to produce a fused high resolution colour streaming video signal ("HC") 28 using the methods described herein.

Figure 5:
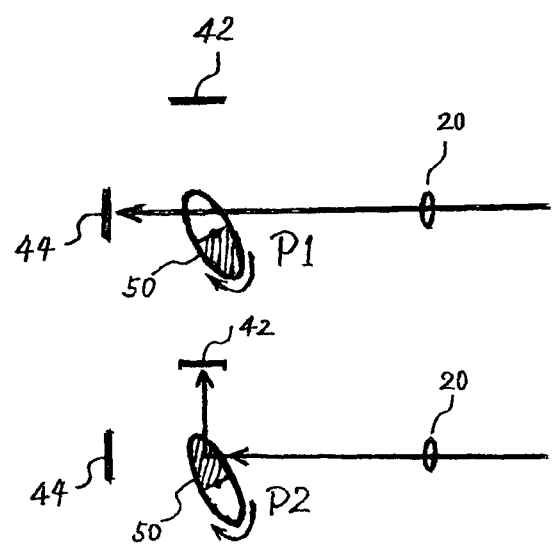
FIG. 5 is a schematic diagram of a rotating half mirror system according to one or more embodiments of the present invention.

In a still further embodiment, referring to FIG. 5, a rotating half mirror 50 or vibrating mirror (not shown) can be used in place of the splitter 40 of FIG. 4. The half mirror 50 rotates between a first position (P1) where incident light from the lens 20 passes through the empty half of the mirror directly reaching the sensor 44 and a second position (P2) where incident light passing through the lens 20 is directed by the half mirror to the sensor 42. The mirror 50 rotates between the first and second positions sufficiently quickly to obtain a suitable image pair of a scene.

It is understood that other devices can be used in place of splitter 40 or a mirror 50, as long as they can direct incident light from lens 20 towards both sensor 42 and sensor 44 simultaneously.

The following embodiments of the invention may be included in camera imaging systems and methods described above or in other devices, systems, cameras and methods, such as the ones described below.

High Resolution Pan and Low Resolution 3-Color MS.

Figure 7:
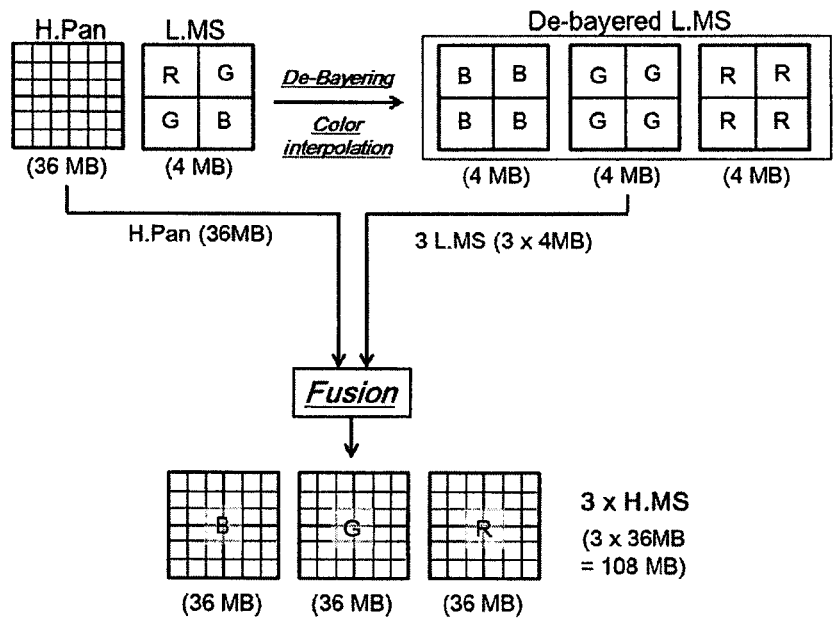
FIG. 7 illustrates a configuration of a 2-chip color camera system and method, according to one embodiment of the invention.

FIG. 7 illustrates the configuration of a 2-chip color camera, according to one embodiment of the invention, with one high resolution Pan (H.Pan) sensor and one low resolution MS (L.MS) sensor, and the steps of creating a high resolution color image. The L.MS sensor has a RGB Bayer filter (3-color) to allow each pixel to receive only one of the three primary colors. A de-bayering process is carried out in the camera to interpolate the recorded red, green and blue pixels to produce three low resolution color image bands (De-bayered L.MS).

The H.Pan and the De-bayered L.MS images are fused together when there is a need to see or use the high resolution color image (3×H.MS). If there is no immediate need to see or use the high resolution color image, the H.Pan image and De-bayered L.MS image will not be fused together.

Assuming the H.Pan has 36 MB and the De-bayered L.MS has 3×4 MB all with 8 bits per pixel, the total data volume is 48 MB before the fusion and 108 MB after the fusion. If the 48 MB is used for storage and transmission purposes and the 108 MB is used for final uses of the high resolution color image, a compression ratio of more than 2:1 is achieved.

Figure 8:
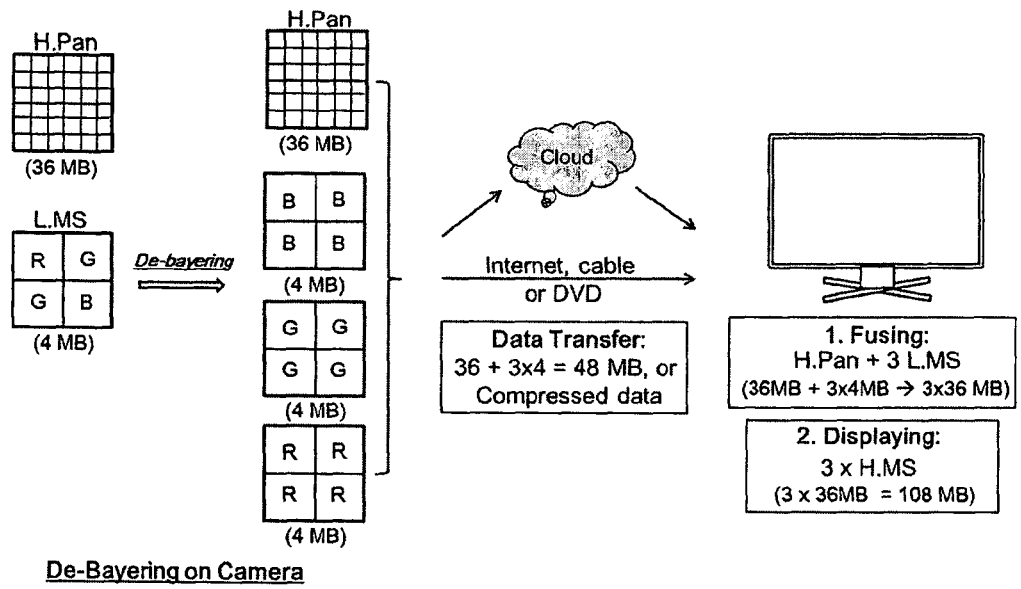
FIG. 8 is an illustration of the image data flow and the image data volume in the transmission, storage and display stages according to one embodiment of the invention.

FIG. 8 is a conceptual illustration of the image data flow and the image data volume in the transmission, storage and display stages. If the raw data (no compression) are used, the H.Pan (36 MB) and the three De-bayered low resolution color bands (3×4 MB), totaling 48 MB, are used for data storage, in a camera storage, DVD or other storage devices, and for data transmission, through a network such as the Internet or the cloud, or through a direct connection such as through a cable. For viewing color image on the camera screen, only 12 MB of the De-bayered low resolution color image is needed. When the high resolution color image needs to be displayed or used for other purposes, the image fusion is used to produce the high resolution color image (3×36 MB), totaling 108 MB, in real time on the display side. More than 2:1 data compression ratio is achieved for storage and transmission.

An image compression can be applied to the H.Pan and the De-bayered L.MS image respectively to further reduce the data volume on top of the 2:1 compression ratio. When the high resolution color image is needed, a decompression needs to be applied before the image fusion. A much higher data compression ratio can be achieved for storage and transmission.

Figure 9:
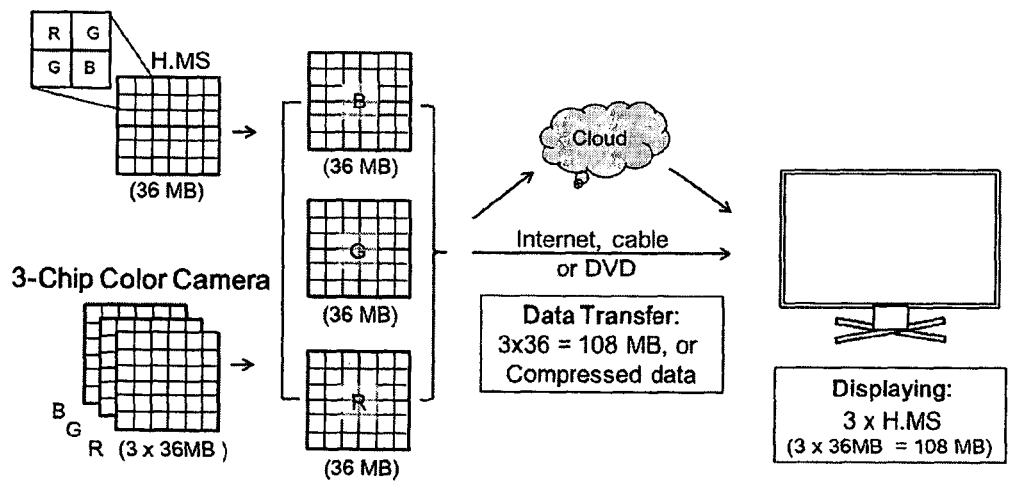
FIG. 9 illustrates image transmission, storage and display flow of prior art 1-chip color and 3-chip color cameras.

FIG. 9 illustrates the concept of the image transmission, storage and display flow of conventional 1-chip color and 3-chip color cameras. If the raw image data are used, the three high resolution (RGB) color bands (3×36 MB), totaling 108 MB, are used for viewing on the camera screen; for data storage in a camera storage, DVD or other storage devices; for data transmission through the Internet, cable or the cloud; and for final display and other purposes. No data compression is achieved for the storage and transmission.

If an image compression is applied, the data volume of the high resolution color image can be reduced. However, the data compression ratio is significantly lower than that of the 2-chip color camera described above for keeping the same image quality.

High Resolution Pan and Low Resolution 4-Color MS

Figure 10:
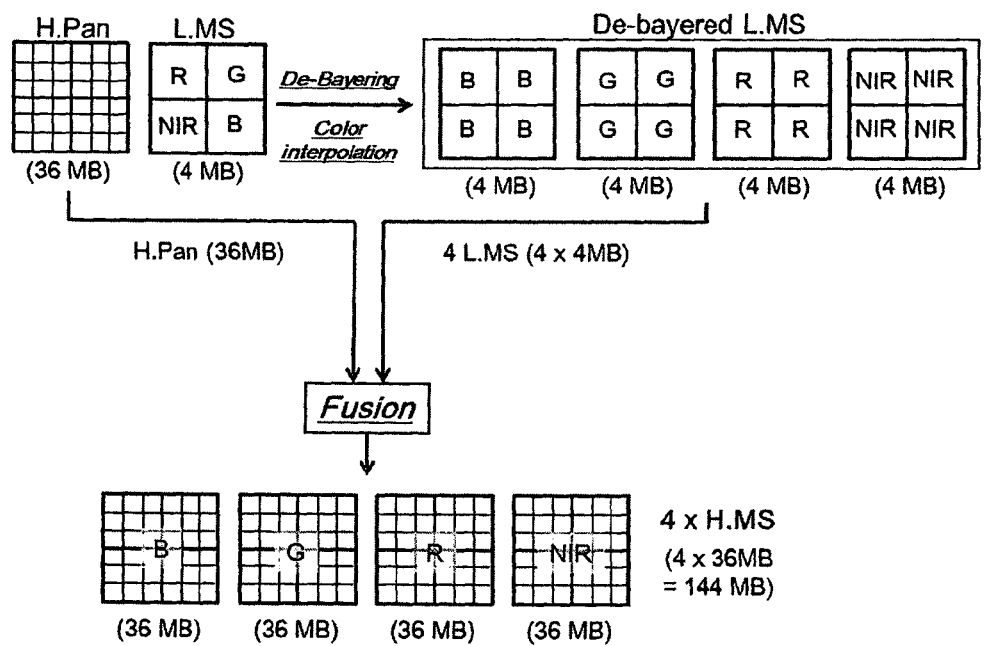
FIG. 10 illustrates the configuration of a 2-chip 4-color color camera with one high resolution Pan (H.Pan) sensor and one low resolution 4-color MS (L.MS) sensor, and steps of creating a high resolution color image, according to one embodiment of the invention.

FIG. 10 illustrates the configuration of a 2-chip 4-color color camera with one high resolution Pan (H.Pan) sensor and one low resolution 4-color MS (L.MS) sensor, and the steps of creating a high resolution color image. The L.MS sensor has a R-G-B-NIR color filter to allow each pixel just to receive either red, green, blue or near infrared (NIR) respectively. A color interpolation similar to de-bayering process is done in the camera to interpolate the recorded red, green, blue and NIR pixels to produce four low resolution color image bands (De-bayered L.MS).

The H.Pan and the De-bayered L.MS images are fused together when there is a need to see or use the high resolution 4-color image (4×H.MS). If there is no immediate need to see or use the high resolution color image, the H.Pan image and De-bayered L.MS image will not be fused together.

Assuming the H.Pan has 36 MB and the De-bayered L.MS has 4×4 MB, all with 8 bits per pixel, the total data volume is 52 MB before the fusion and 144 MB after the fusion. If the 52 MB is used for storage and transmission purposes and the 144 MB is used for final uses of the high resolution 4-color image, a compression ratio of more than 2.5:1 is achieved.

For color visualization, only three color bands are used. When the R, G, and B bands are displayed, a natural color image can be visualized. When the NIR band and two other color bands are displayed, a color infrared image can be visualized.

Figure 11:
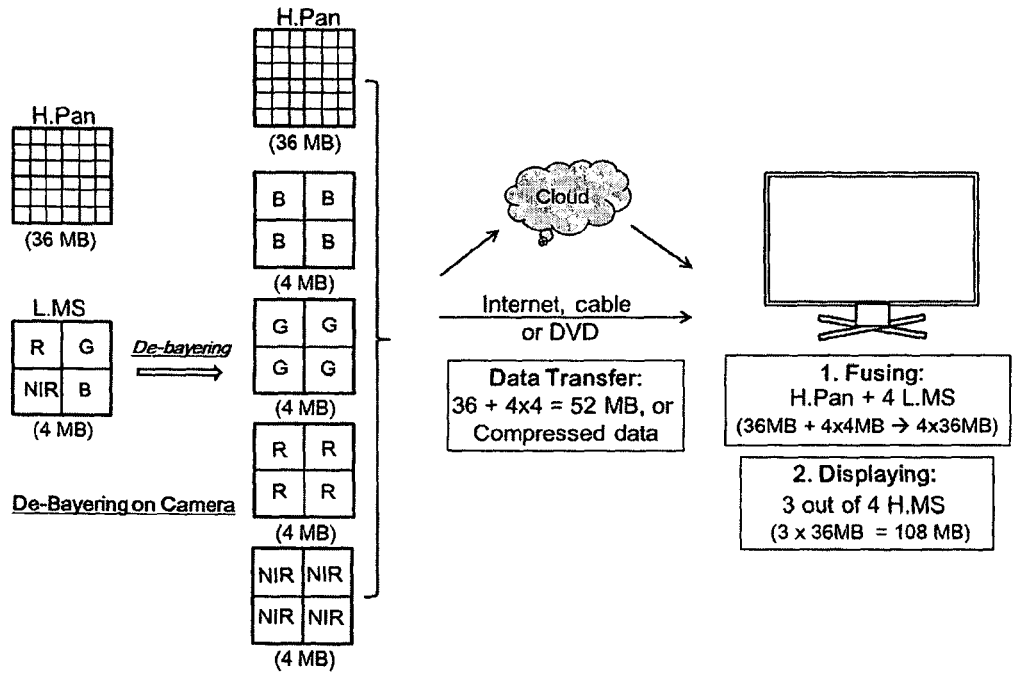
FIG. 11 is a conceptual illustration of image data flow and image data volume in the transmission, storage and display stages, according to an embodiment of the invention.

FIG. 11 is a conceptual illustration of the image data flow and the image data volume in the transmission, storage and display stages. If the raw data (no compression) are used, the H.Pan (36 MB) and the four De-bayered low resolution color bands (4×4 MB), totaling 52 MB, are used for data storage, in a camera storage, DVD or other storage devices, and for data transmission, through the Internet, cable or the cloud. For viewing color image on the camera screen, only three color bands out of the four De-bayered low resolution color bands, 12 MB, are needed. When the high resolution color image needs to be displayed or used for other purposes, the image fusion is used to produce the 4-color high resolution color image (4×36 MB), totaling 144 MB, in real time on the display side. More than 2.5:1 data compression is achieved for storage and transmission.

An image compression can be applied to the H.Pan image and the De-bayered low resolution 4-color image respectively, the total image data volume can be further reduced on top of the 2.5:1 compression ratio. When the high resolution color image is needed, a decompression needs to be applied before the image fusion. A much higher data compression ratio can be achieved for storage and transmission.

Figure 12:
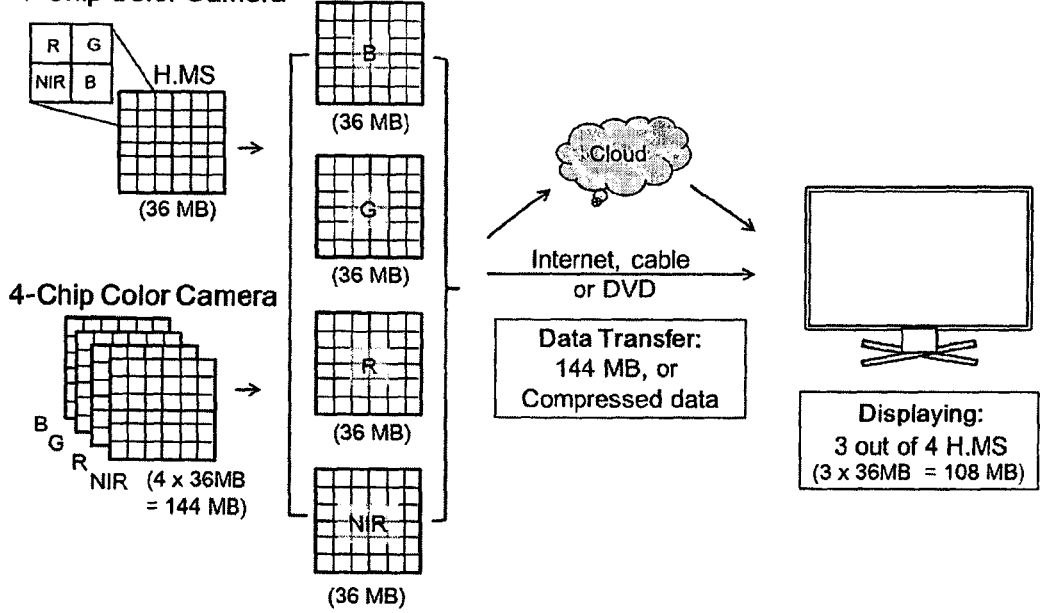
FIG. 12 illustrates the concept of the image transmission, storage and display flow of a 1-chip 4-color and 4-chip 4-color cameras based in a prior art design.

FIG. 12 illustrates the concept of the image transmission, storage and display flow of a 1-chip 4-color and 4-chip 4-color cameras based on the conventional camera design. No 1-chip 4-color camera has been found in the market; whereas a few 4-chip 4-color cameras have been developed for remote sensing purposes. If the raw image data are used, the four high resolution color bands (RGB and NIR) (4×36 MB), totaling 144 MB, are used for data storage in a camera storage, DVD or other storage devices; for data transmission through the Internet, cable or the cloud; and for final display and other purposes. No data compression is achieved for storage and transmission.

If an image compression is applied, the data volume of the high resolution color image can be reduced. However, the data compression ratio can be achieved for storage and transmission is significantly lower than that of the 2-chip 4-color camera described above for keeping the same image quality.

High Resolution Pan and High Resolution 3-Color MS

Figure 13:
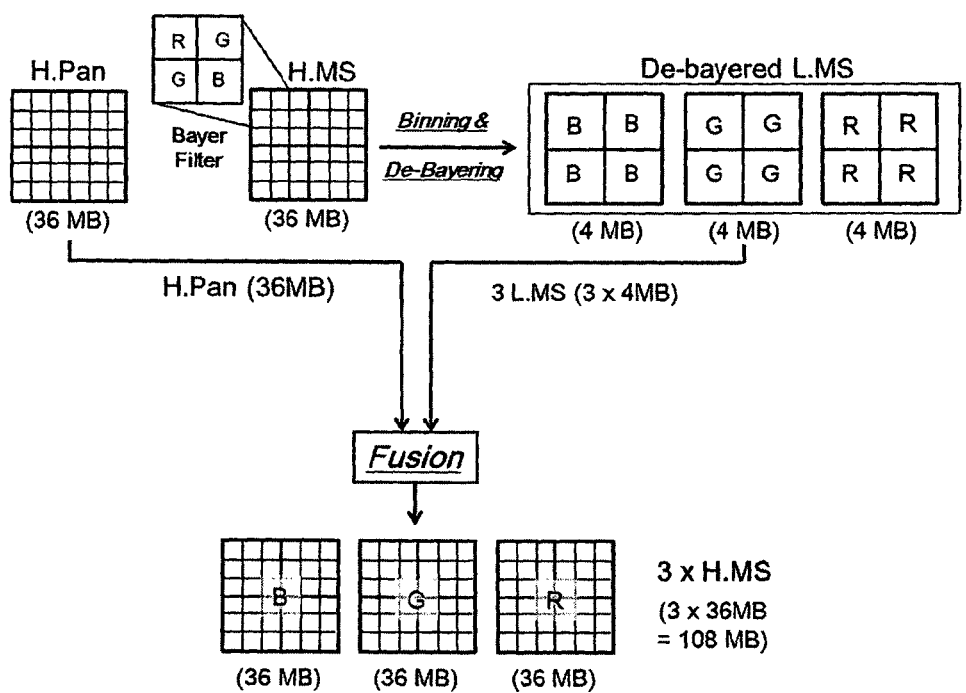
FIG. 13 illustrates the configuration of a 2-chip 3-color camera with two high resolution sensors, one high resolution Pan (H.Pan) sensor and one high resolution MS (H.MS) sensor, and steps of creating a high sensitivity and high resolution color image, according to an embodiment of the invention.

FIG. 13 illustrates the configuration of a 2-chip 3-color camera with two high resolution sensors, one high resolution Pan (H.Pan) sensor and one high resolution MS (H.MS) sensor, and the steps of creating a high sensitivity and high resolution color image. The H.MS sensor has a RGB Bayer filter to allow each pixel just to receive one of the three primary colors. A pixel binning and de-bayering process is conducted in the camera to lower the resolution of the color bands to produce three low resolution color bands (De-bayered L.MS) and to increase the sensitivity of the color sensor. Depending on the design of the binning process, the de-bayering process can be removed without having a negative impact.

The H.Pan and the De-bayered L.MS images are fused together when there is a need to see or use the high resolution color image (3×H.MS). The fused high resolution color image has much better image quality than that of a 1-chip 3-color high resolution camera, because the 2-chip 3-color camera has a much higher light sensitivity and produces a full resolution color image, not "hollow" resolution.

Assuming the H.Pan has 36 MB and the De-bayered L.MS has 3×4 MB, all with 8 bits per pixel, the total data volume is 48 MB before the fusion and 108 MB after the fusion. If the 48 MB is used for storage and transmission purposes and the 108 MB is used for final uses of the high resolution color image, a compression ratio of more than 2:1 is achieved.

An image compression can be applied to the H.Pan and the De-bayered low resolution color image respectively to further reduce the data volume on top of the 2:1 compression ratio. A much higher data compression ratio can be achieved for storage and transmission.

High Resolution Pan and High Resolution 4-Color MS

Figure 14:
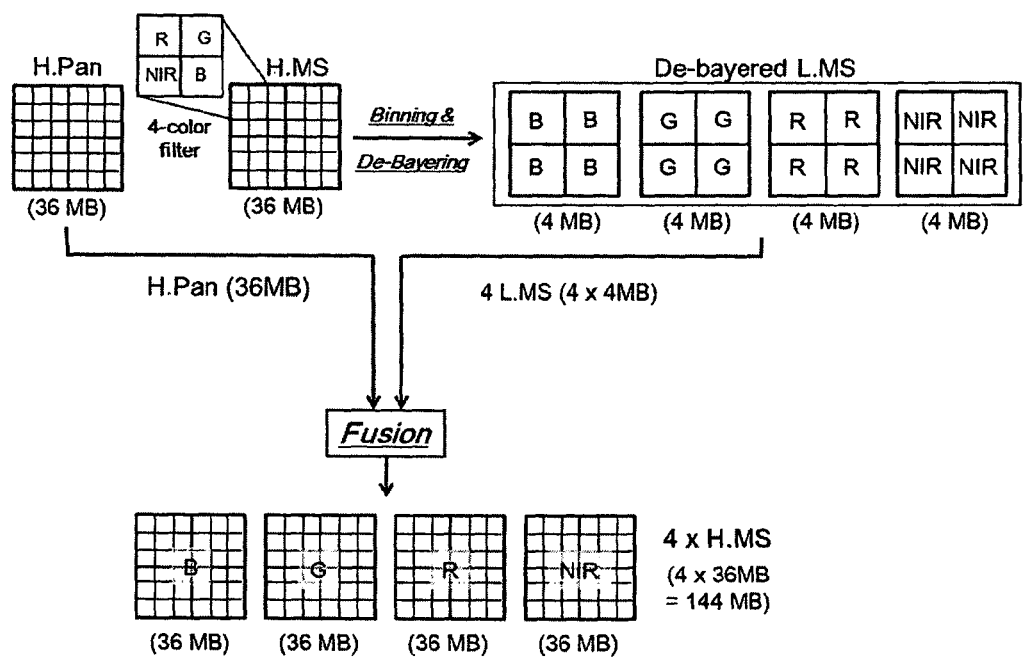
FIG. 14 illustrates the configuration of a 2-chip 4-color camera with two high resolution sensors, one high resolution Pan (H.Pan) sensor and one high resolution 4-color MS (H.MS) sensor, and steps of creating a high resolution color image, according to an embodiment of the invention.

FIG. 14 illustrates the configuration of a 2-chip 4-color camera with two high resolution sensors, one high resolution Pan (H.Pan) sensor and one high resolution 4-color MS (H.MS) sensor, and the steps of creating a high resolution color image. The H.MS sensor has a R-G-B-NIR color filter to allow each pixel just to receive either R, G, B or NIR respectively. A pixel binning and de-bayering process is conducted in the camera to lower the resolution of the color bands to produce four low resolution color bands (De-bayered L.MS) and to increase the sensitivity of the color sensor. Depending on the design of the binning process, the de-bayering process can be removed without having a negative impact.

The H.Pan and the De-bayered L.MS images are fused together when there is a need to see or use the high resolution color image (4×H.MS). If there is no immediate need to see or use the high resolution color image, the H.Pan image and De-bayered L.MS image will not be fused together.

Assuming the H.Pan has 36 MB and the De-bayered L.MS has 4×4 MB, the total data volume is 52 MB before the fusion and 144 MB after the fusion. If the 52 MB is used for storage and transmission purposes and the 144 MB is used for final uses of the high resolution 4-color image, a compression ratio of more than 2.5:1 is achieved.

An image compression can be applied to the H.Pan and the De-bayered low resolution color image to further reduce the data volume on top of the 2.5:1 compression ratio. A much higher data compression ratio can be achieved for storage and transmission.

A Variation of High Resolution Pan and Low Resolution 3-Color MS

Figure 15:
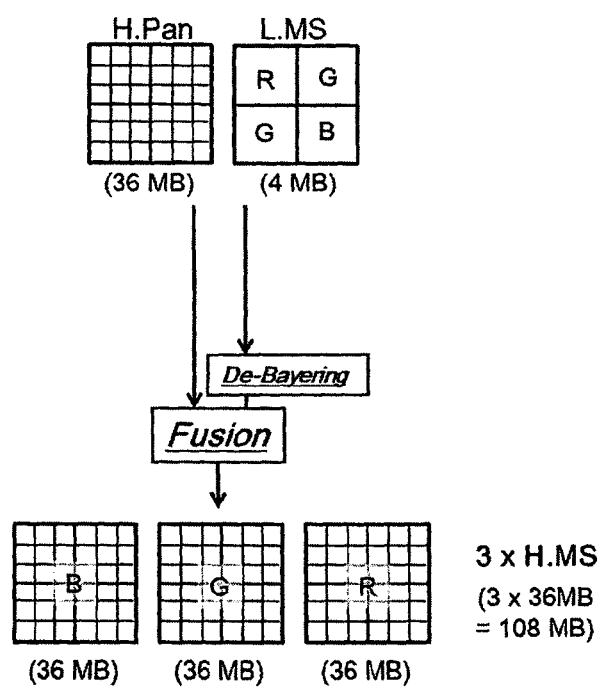
FIG. 15 illustrates the configuration of a 2-chip color camera with one high resolution Pan (H.Pan) sensor and one low resolution MS (L.MS) sensor, according to the invention.

FIG. 15 illustrates the configuration of a 2-chip color camera with one high resolution Pan (H.Pan) sensor and one low resolution MS (L.MS) sensor. The L.MS sensor has a RGB Bayer filter to allow each pixel just to receive one of the three primary colors. However, a de-bayering process is not done in the camera but on the display side after the transmission and before the image fusion and image display. The H.Pan and the De-bayered L.MS images are fused together when there is a need to see or use the high resolution color image (3×H.MS).

Figure 16:
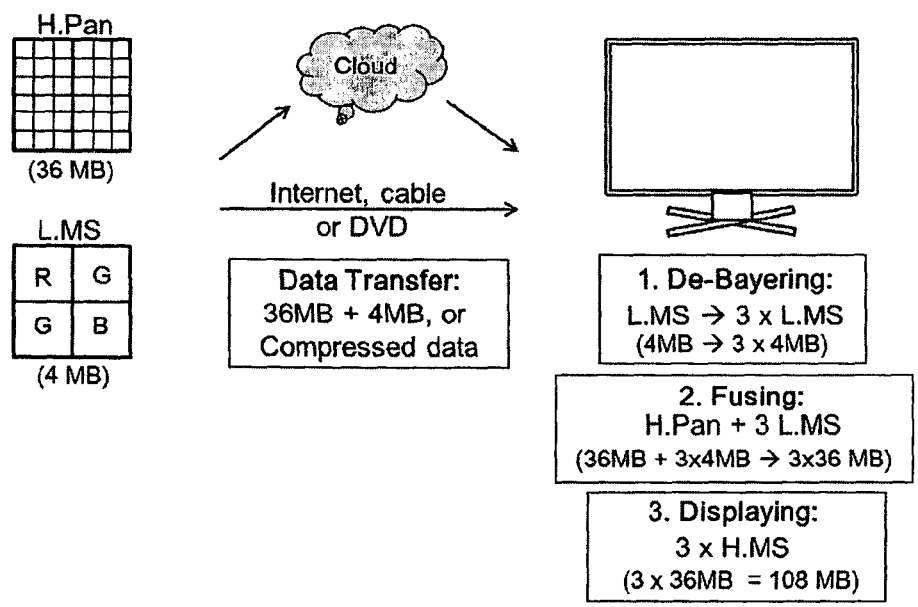
FIG. 16 illustrates data size before and after de-bayering and fusion, according to an embodiment of the invention.

As illustrated in FIG. 16, assuming the H.Pan has 36 MB and the L.MS before de-bayering has 4 MB, the total data volume is 40 MB before the de-bayering and fusion and 108 MB after the de-bayering and fusion. If the 40 MB is used for storage and transmission purposes and the 108 MB is used for final uses of the high resolution color image, a compression ratio of 2.7:1 is achieved.

A Variation of High Resolution Pan and Low Resolution 4-Color MS

Figure 17:
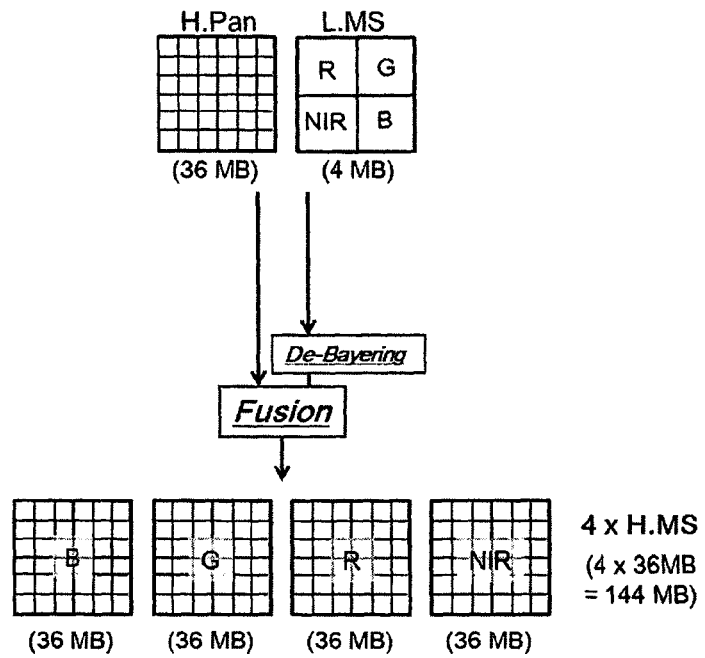
FIG. 17 illustrates the configuration of a 2-chip 4-color camera with one high resolution Pan (H.Pan) sensor and one low resolution 4-color MS (L.MS) sensor, according to an embodiment of the invention.

FIG. 17 illustrates the configuration of a 2-chip 4-color camera with one high resolution Pan (H.Pan) sensor and one low resolution 4-color MS (L.MS) sensor. The L.MS sensor has a R-G-B-NIR color filter to allow each pixel just to receive either R, G, B or NIR color. A de-bayering process is done on the display side after the transmission and before the image fusion and image display. The H.Pan and the De-bayered L.MS images are fused together when there is a need to see or use the high resolution color image (4×H.MS). If there is no immediate need to see or use the high resolution color image, the H.Pan image and De-bayered L.MS image will not be fused together.

Figure 18:
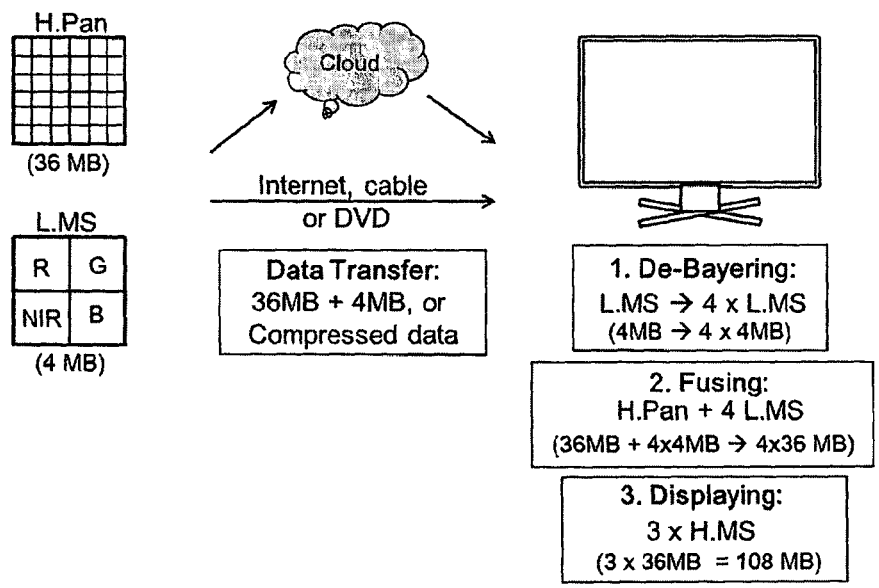
FIG. 18 illustrates data size before and after de-bayering and fusion, according to an embodiment of the invention.

As illustrated in FIG. 18, assuming the H.Pan has 36 MB and the L.MS before de-bayering has 4 MB, the total data volume is 40 MB before the de-bayering and fusion and 144 MB after the de-bayering and fusion. If the 40 MB is used for storage and transmission purposes and the 144 MB (4×36 MB) is used for final applications of the high resolution color image, a compression ratio of 3.6:1 is achieved.

A Variation of High Resolution Pan and High Resolution 3-Color MS

Figure 19:
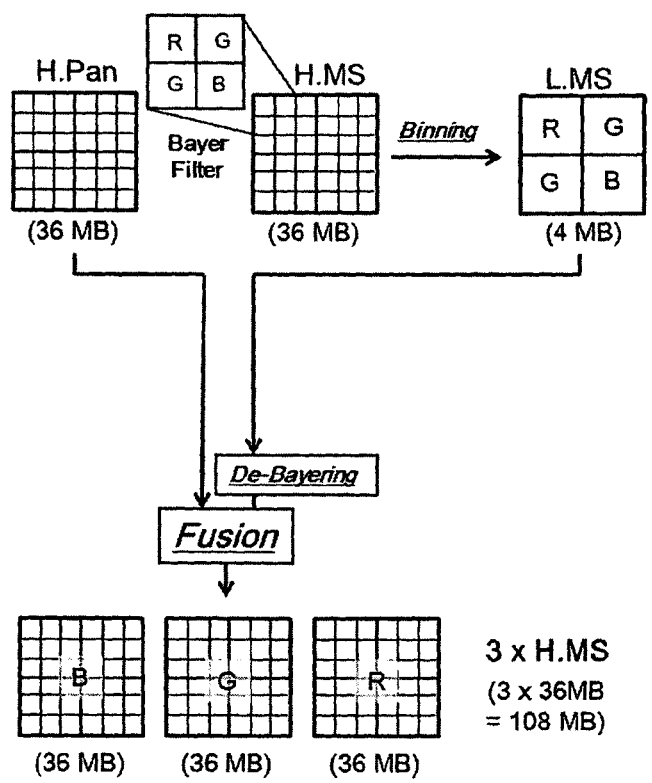
FIG. 19 illustrates the configuration of a 2-chip color camera with two high resolution sensors, one high resolution Pan (H.Pan) sensor and one high resolution MS (H.MS) sensor, according to an embodiment of the invention.

FIG. 19 illustrates the configuration of a 2-chip color camera with two high resolution sensors, one high resolution Pan (H.Pan) sensor and one high resolution MS (H.MS) sensor. The H.MS sensor has a RGB Bayer filter. A pixel binning is conducted in the camera to lower the resolution of the color pixels to create low resolution MS (L.MS) to increase the sensitivity of the color sensor.

The H.Pan (36 MB) and the L.MS (4 MB), totaling 40 MB, are stored and transmitted to a recipient device. When the high resolution color image is needed, a de-bayering process and fusion process are conducted to produce a high resolution color image (3×36 MB), totaling 108 MB; achieving a 2.7:1 compression ratio for the raw color image.

A Variation of High Resolution Pan and High Resolution 4-Color MS

Figure 20:
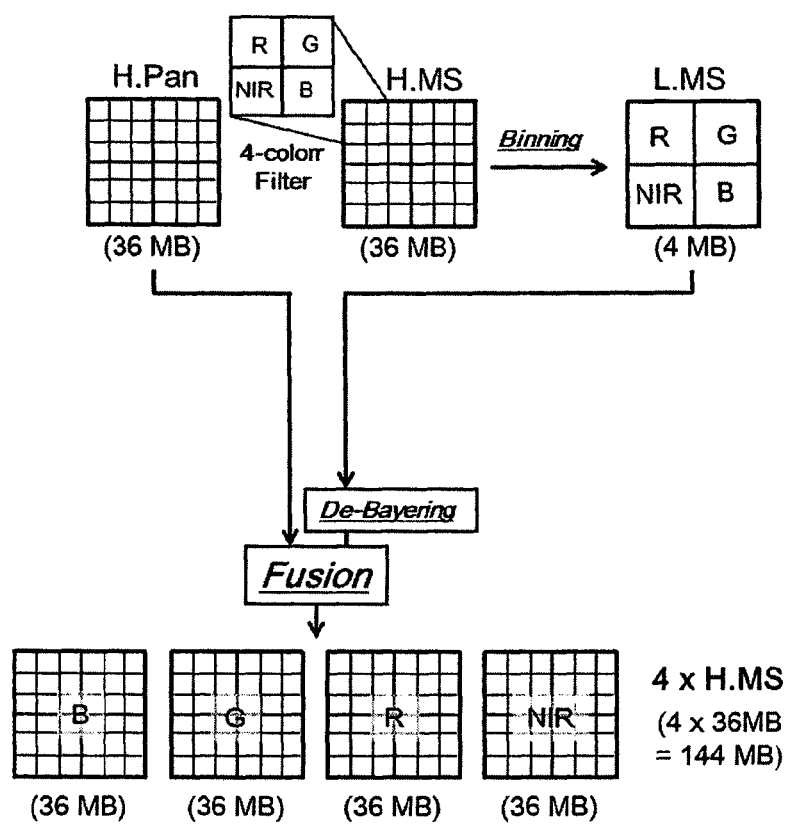
FIG. 20 illustrates the configuration of a 2-chip 4-color camera with two high resolution sensors, one high resolution Pan (H.Pan) sensor and one high resolution MS (H.MS) sensor with a R-G-B-NIR color filter, according to an embodiment of the invention.
Figure 21:
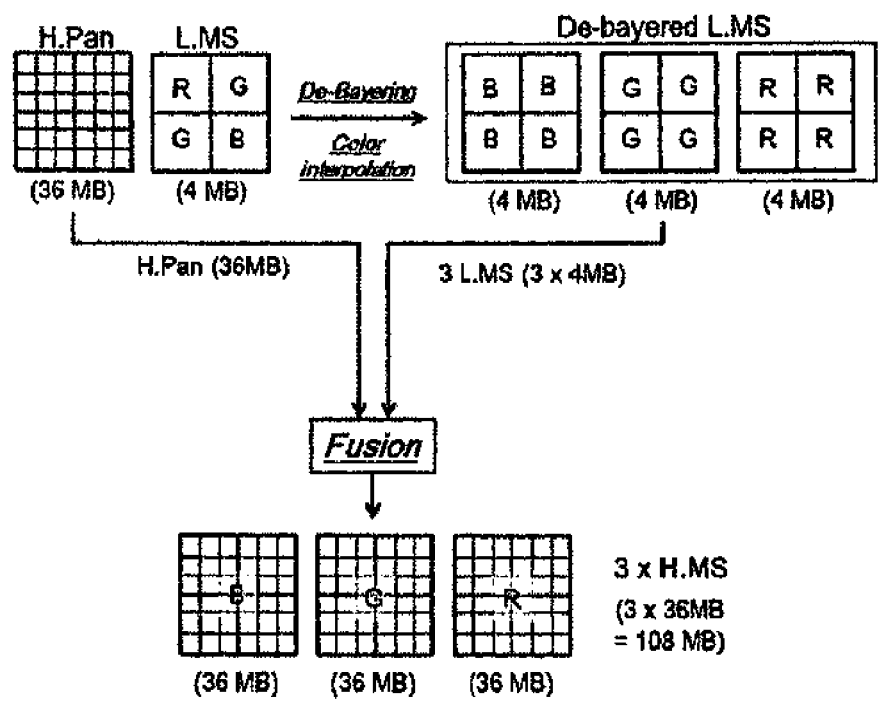
FIG. 21 illustrates a configuration of a 1-chip color camera system and method, according to one embodiment of the invention.

FIG. 20 illustrates the configuration of a 2-chip 4-color camera with two high resolution sensors, one high resolution Pan (H.Pan) sensor and one high resolution MS (H.MS) sensor with a R-G-B-NIR color filter. A pixel binning is conducted in the camera to lower the resolution of the color pixels to create low resolution MS (L.MS) to increase the sensitivity of the color sensor.

The H.Pan (36 MB) and the L.MS (4 MB), totaling 40 MB, are stored and transmitted to a recipient device. When the high resolution color image is needed, a de-bayering process and fusion process are conducted to produce a high resolution color image (4×36 MB), totaling $144 MB; achieving a 3.6:1 compression ratio for the raw color image.

Note: the abovementioned sensor configurations and image depth (i.e. 8 bits) are just some examples. Along the line of thought disclosed in the invention, other sensor configurations are possible. Other image depths can also be used, such as 6 bits, 11 bits, 12 bits or 16 bits, depending on the need.

Ratio of Pixel Sizes and Number of Bands Between Pan and MS

Ratio of Pixel Sizes

In FIGS. 7 through 20, the resolution difference between the Pan image and MS image is based on the assumption that the linear ratio of pixel sizes between H.Pan and L.MS is 1:3, i.e. 3×3 Pan pixels cover the same area of 1 MS pixel. The resolution difference between H.Pan and L.MS can also be set to a linear pixel size ratio of 1:8, 1:7, 1:6, 1:5, 1:4, 1:2 or 1:1, etc., depending on the lighting condition of the scene and sensitivity difference between the Pan sensor and the MS sensor. Generally, in darker lighting condition, a larger linear pixel size ratio, such as 1:6 or 1:5 or 1:4, should be used. In bright condition, 1:2 or 1:1 ratio can be used. If the sensitivity difference between Pan and MS is large, a large linear pixel size ratio (such as 1:7, 1:6, 1:5, or 1:4) should be used too, to boost the sensitivity of the color sensor.

If the linear pixel size ratio between Pan and MS cannot be easily changed through pixel binning, a linear pixel size ratio of 1:4 or 1:3 is recommended.

The larger the linear pixel size ratio between Pan and MS is, the higher is the image compression ratio.

Number of Bands

In FIGS. 7 through 20, the number of color bands is assumed to be 3 or 4. Three color bands (RGB) are widely used in normal consumer products. Four color bands (R, G, B, NIR) can be useful for professional uses, such as scientific, industry, security, and military uses. More than four color bands can be developed through redesign the color filter.

The more color bands are used, the higher is the image compression ratio.

As discussed above with respect to certain embodiments of the invention, an effective way to utilize the sensor compressed color images for saving storage space and increasing transmission speed is to:

fuse the high resolution Pan and low resolution MS images only when the final high resolution MS image is needed, which is similar to image decompression that is only used when the decompressed color image is needed; or debayer the low resolution color image and fuse the debayered low resolution color image with the high resolution Pan image when the final high resolution MS image is needed.

To further compress the image, the high resolution Pan and low resolution MS images can be further compressed respectively, using a compression technique, such as JPEG, JPEG 2000, or others. When the final high resolution MS image is needed, the Pan and MS images need to be decompressed respectively and then fused together to produce the final high resolution MS image. Otherwise, the Pan and MS images will not be decompressed and fused, to keep a small data volume for storage and transmission.

For video image streams, still image compression, such as JPEG, and video image compression, such as H.264 or MPEG-4, can be applied to the high resolution Pan and low resolution MS image streams respectively to further compress the Pan and MS video image streams. When the final high resolution MS video image stream is needed, the Pan and MS image streams need to be decompressed respectively and then fused together to produce the final high resolution MS image stream. Otherwise, the Pan and MS image streams will not be decompressed and fused, to keep a small data volume.

The image compression, video compression and/or image fusion software can be pre-installed on the end users' computer or display device. The final high resolution color image or color image stream is produced when it is needed. If the Pan and MS images or image streams are not compressed using either an image compression or video compression technique, the image fusion technique can be directly applied to fuse the Pan and MS images or image streams.

The image compression, video compression and/or image fusion software can also be bundled together with the high resolution Pan and low resolution MS images or image streams. The image compression and/or video compression can be called on demand to compress the Pan and MS image respectively for storage or transmission purposes, and then called to decompress the Pan and MS image respectively when the final high resolution MS images or image streams are needed. After the decompression, the image fusion will be applied to produce the final high resolution MS image or image stream. If no compression is called to compress the Pan and MS images, the image fusion can be directly applied to produce the final high resolution MS image or image stream.

Software Implementation:

Systems and methods according to the invention can be implemented by software that runs on a camera imaging system or on a client device. For color still images, the invention also relates to a new dual image format which contains a high resolution Pan image and a low resolution MS image in one digital file, to facilitate image storage and transmission. The Pan image and MS image in the dual image format can be raw images, images in TIFF format or in other formats without any data compression. The Pan and MS images should be in the same image format (e.g. either raw, or TIF or another format) and then be stored in the dual image format.

In another aspect of the invention, a new dual image format is provided that contains a compressed high resolution Pan image and a compressed low resolution MS image, to facilitate image storage and transmission. The compressed Pan image and MS image can be in either JPEG, JPEG 2000, or other formats which can compress still images. The same format should be used store the compressed Pan and MS images.

In a further aspect, a new dual image format can be developed that contains a high resolution Pan image, a low resolution MS image, and an image fusion software to facilitate image storage, transmission and producing high resolution MS image when it is needed.

In a still further aspect, a new image format can be developed that contains a compressed high resolution Pan image, a compressed low resolution MS image, a decompression software and an image fusion software, for facilitating image storage and transmission and producing high resolution MS image when it is needed. The decompression software is correlated to the compression image format that is used to store the compressed Pan and MS images, such as JPEG, JPEG 2000, or other formats.

In a still further aspect, a new dual image format can be developed that contains a high resolution Pan image, a low resolution MS image, a compression and decompression software and an image fusion software. Depending on the need, users can call the compression and decompression and the image fusion when there is a need. The compression and decompression software can compress the Pan and MS images in one of the compressed image formats, such as JPEG, JPEG 2000, or other formats, and then decompress the Pan and MS images. If the user does not call the compression function, the dual image format will contain un-compressed Pan and MS images. If the user calls the compression function, the dual image format will contain compressed Pan and MS images. If the user does not call the fusion, or does not call the decompression and fusion, the Pan and MS images will not be decompressed and fused. Depending on the need, the fusion or the decompression and fusion can be called at the user end when the dual image format file is downloaded or displayed on a large display.

In a still further aspect, a new dual image format Writer and Reader software tool is provided to allow users to generate a dual image format by writing a Pan and a MS image into the dual image format; and allow users to generate a high resolution color image by reading the Pan and MS images from the dual image format and fusing them together. The dual image Writer and Reader software can be downloaded from the Internet and installed on users' devices or displays.

In another aspect of the invention, for color video image streams, a new dual video image format is provided that contains a high resolution Pan video stream and a low resolution MS video stream, both are synchronized to each other, for facilitating video image storage and transmission. The Pan video and MS video in the dual video image format can be raw images, or in other formats without any data compression. The Pan and MS videos should be in the same image format.

In another aspect of the invention, a new dual video image format can be developed that contains a compressed high resolution Pan video stream and a compressed low resolution MS video stream, both are synchronized to each other, for facilitating image storage and transmission. The compressed Pan and MS video streams can be in a compressed video image format, such as H.264 or MPEG-4. Each image frame in the videos can be compressed using a still image compression too, such JPEG, JPEG 2000, or other formats which can compress still images. The same format should be used store the compressed Pan and MS video streams.

In another aspect of the invention, a new dual video image format can be developed that contains a high resolution Pan video image stream, a low resolution MS video image stream, and an image fusion software to facilitate video storage and transmission and producing high resolution MS video stream when it is needed.

In another aspect of the invention, a new dual video image format can be developed that contains a compressed high resolution Pan video stream, a compressed low resolution MS video stream, a decompression software and image fusion software, for facilitating video storage and transmission and producing high resolution MS video stream when it is needed. The decompression software is correlated to the compression video format that is used to store the compressed Pan and MS video streams, such as H.264 or MPEG-4, or other formats.

In another aspect of the invention, a new dual video image format can be developed that contains a high resolution Pan video image stream, a low resolution MS video image stream, a compression and decompression software and an image fusion software. Depending on the need, users can call the compression and decompression and the image fusion when there is a need. The compression and decompression software can compress the Pan and MS video stream respectively, and then decompress the Pan and MS video streams. If the user does not call the compression function, the dual video format will contain un-compressed Pan and MS video streams. If the user calls the compression function, the dual video format will contain compressed Pan and MS video streams. If the user does not call the fusion, or does not call the decompression and fusion, the Pan and MS video streams will not be decompressed and fused. Depending on the need, the fusion or the decompression and fusion can be called at the user end when the dual video format file is downloaded or displayed on a large display.

In another aspect of the invention, a new dual video format Writer and Reader software tool can also be developed to allow users to generate a dual video format by writing a Pan and a MS video streams into the dual video format; and allow users to generate a high resolution color video stream by reading the Pan and MS video streams from the dual video format and fusing them together. The dual image Writer and Reader software can be downloaded from the Internet and installed on users' devices or displays.

Although the high resolution Pan and low resolution MS images described in this disclosure are collected by 1-chip Pan frame sensor and 1-chip color frame sensor, other sensors such as linear sensors can also be used to collect a high resolution Pan image and low resolution MS image respectively. Therefore, this invention also applies to images collected by linear sensors.

In accordance with a further aspect of the invention, a new color image compression method is provided to compress color images captured by a conventional color camera, through the steps of (1) simulating a black and white image from the high resolution color image or multispectral image (MS), (2) lowering the spatial resolution of the MS image bands to achieve the first level of color image compression, and (3) applying further image compression to the simulated high resolution Pan and the generated low resolution MS image bands to achieve a higher image compression ratio.

The present invention can be used with cloud computing applications where the direct sensor compression methods can be used to effectively reduce image data volume for storage, transmission and online computation.

What is claimed is:

1. A method comprising:
providing a digital image from a camera imaging sensor wherein the image comprises both multispectral and panchromatic information;
interpolating the digital image to obtain a low resolution multispectral digital image,
interpolating the digital image to obtain a high resolution monochromatic digital image,
fusing the low resolution multispectral digital image and the high resolution monochromatic digital image to produce a high resolution multi-spectral image.

2. The method of claim 1, wherein the low resolution multispectral digital image and the high resolution monochromatic digital image are fused using a method selected from the group consisting of fusion methods disclosed in U.S. Pat. No. 7,340,099, arithmetic based, statistics based, ratio based and wavelet based fusion.

3. The method of claim 1, wherein the camera imaging sensor is a 1-chip color camera.

4. The method of claim 1, wherein the digital image is a frame from a stream of digital video image frames.

5. The method of claim 1, wherein the information comprises information selected from the group comprising one or more of RGB, P and IR pixels.

6. A method comprising:
producing a high resolution panchromatic image and a low resolution multispectral image collected from a 1-chip image frame sensor, where the panchromatic image and the multispectral image are produced using the full frame of the 1-chip image frame sensor, and
fusing the high resolution panchromatic image and the low resolution multispectral image to produce a high resolution multispectral image.

* * * * *